Dec. 22, 1959   P. E. WIEGAND   2,918,240
CABLE CLAMP
Filed May 6, 1955
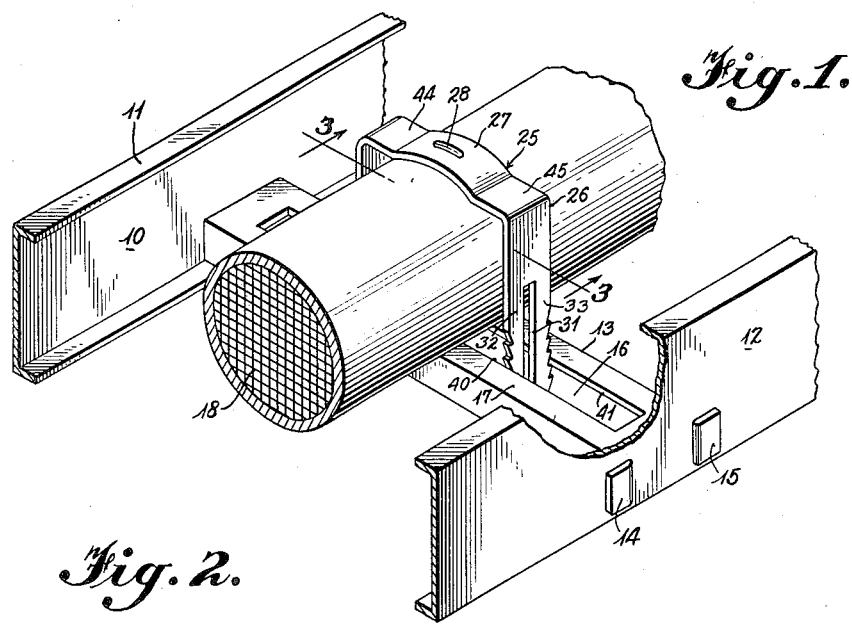
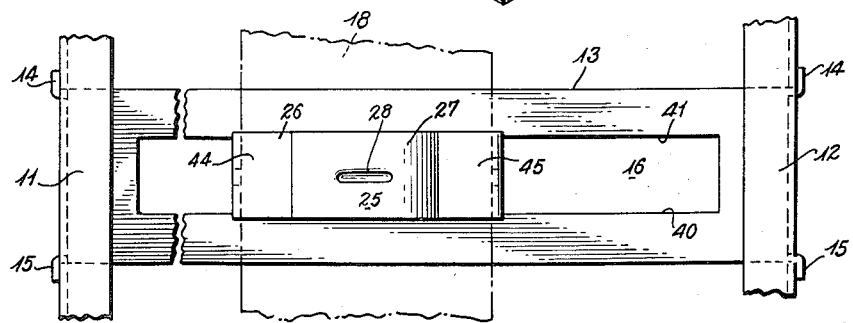
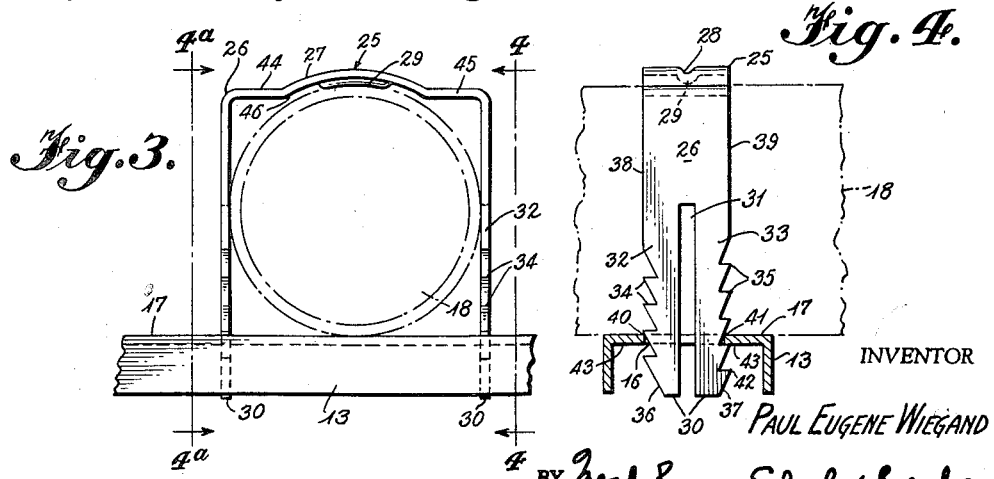
INVENTOR
PAUL EUGENE WIEGAND
BY
ATTORNEYS United States Patent Office 2,918,240
Patented Dec. 22, 1959

2,918,240

CABLE CLAMP

Paul Eugene Wiegand, Columbia Station, Ohio

Application May 6, 1955, Serial No. 506,567

3 Claims. (Cl. 248—71)

This invention relates to a cable clamp, and more particularly, to a boltless cable clamp for locking one or more cables to a supporting member for the cables.

It is customary in large industrial plants to have electrical power supplied to the various machines and equipment by a plurality of cables suspended on overhead cable racks. These racks extend throughout the plant in various directions depending upon the location of the particular machines and, as machines are either moved or replaced by other machines requiring a larger power supply, it becomes necessary to remove or replace the particular cable supplying such a machine or series of machines.

As the cable rack supports a plurality of cables, it is difficult to remove or replace a single cable without disturbing some or all of the remaining ones and the frequent frictional movement of the cables on the rack causes a wearing away of the cable insulation. To overcome these difficulties, it has been the practice to clamp the individual cables to the rack at spaced intervals so that the removal of a single cable therefrom may be accomplished quickly and easily without disturbing, lifting, or pulling any of the remaining cables from their respective positions. However, many of the clamps which have been used in the past have consisted of several parts (such as threaded bolts and nuts), and have been awkward to apply. As these clamps are rather expensive, and in order to keep the expense of installing the cables to a minimum, only a few clamps are used at greatly spaced intervals to lock the cables to the rack.

This invention obviates the above disadvantages and, since the clamp of this invention costs only a nominal sum to manufacture and may be quickly installed or removed, one is better able to adequately secure the cables onto the rack by using a larger number of clamps at smaller spaced intervals and by installing the clamps in a shorter period of time than it would take to install a smaller number of the more complex clamps presently used.

Therefore, it is an object of this invention to provide a clamp which can be slipped over a cable and quickly snapped into locking position with respect to the slotted supporting member for the cable.

It is another object of this invention to provide a U-shaped cable clamp which may be quickly and easily removed from its locked position on a slotted supporting member for the cable.

A further object of this invention is to provide a one-piece U-shaped cable clamp which has no moving parts and which may be easily manufactured in large quantities at a relatively low cost per unit.

In attaining the objects of this invention one of the features resides in providing a plurality of shoulders on the marginal edges of the clamp for securing the clamp to the under surface of the supporting member adjacent the slot through which a portion of the clamp passes.

Another feature resides in providing a longitudinally extending slot along each leg of the U-shaped clamp so as to make each portion of the clamp adjacent the slot more flexible.

Other objects, features and advantages of the invention will become more apparent from the following specification taken in conjunction with the accompanying drawing wherein Fig. 1 is a perspective view of an embodiment of the invention shown in locked position about a cable on the slotted supporting member of a cable rack.

Fig. 2 is a plan view of the invention shown in Fig. 1.

Fig. 3 is a front elevational view of the invention taken along lines 3—3 of Fig. 1, and Fig. 4 is a side elevational view of the invention taken along either lines 4—4 or 4a—4a of Fig. 3.

As illustrated in Fig. 1 of the drawing, a cable rack 10 has a pair of longitudinally extending stringers 11, 12 spaced from each other by means of a plurality of supporting members 13 (only one shown) having tab portions 14, 15 at each end thereof adapted to be inserted through appropriate perforations in the stringers 11, 12 and then bent over so as to lie adjacent the outer surface of the stringers.

Supporting member 13 is provided with a longitudinally extending slot 16 of predetermined width and has an electrical cable 18 disposed on its supporting surface 17.

In the particular embodiment shown in the drawing, the U-shaped cable clamp 25 is formed from an elongated metal strip 26 and has an arcuate portion 27 provided with a depression 28 on its upper surface and a corresponding arcuate projection 29 on its under surface adapted to engage the cable 18 when the clamp is in locking position on the cable rack. Extending longitudinally inwardly from each of the terminal ends 30 of the strip 26 is a slot 31 dividing the end portions of the strip 26 into a pair of leg members 32, 33 having their outer edges provided with a plurality of shoulders 34, 35. Each of the shoulders 34, 35 is separated from each succeeding shoulder by a downwardly and inwardly extending taper on the outer edge of the strip with the lowermost tapered edge 36 of one leg 32 being greater than the lowermost tapered edge 37 on leg 33 for reasons set forth infra. It is to be noted that the individual shoulders 34, 35 are substantially perpendicular to the longitudinal edges 38, 39 respectively of the strip 26 so that as large an area as possible of the shoulder will engage the under surface of the supporting member 13 adjacent the slot and prevent removal of the clamp therefrom by a simple straight upward lifting of the clamp. While the structure of only one end portion of the U-shaped clamp 25 is described herein, it is to be understood that the pair of leg members on the other end portion of the clamp is similar in structure thereto, and any references to the first pair of leg members will also apply to the second pair of leg members.

Since the width of the strip 26 is slightly larger than the width of the slot 16 in supporting member 13, it will be seen from Fig. 4 of the drawing that, as the pair of legs 32, 33 are inserted through slot 16, the lowermost tapered edges 36, 37 easily pass through the slot 16 until the width of the strip 26 as measured across the tapered edges of legs 32, 33 equals the width of the slot 16. At this point, as a downward force is applied to the clamp 25 the tapered edges 36, 37 engage the edges 40, 41 of the slot 16 and a lateral inward movement or compression of the legs 32, 33 occurs. As the outer corner 42 of the lowermost shoulder 35 passes beyond the slot 16, the width of the strip 26, measured across the tapered edges of legs 32, 33 is again smaller than the width of the slot 16 and the legs 32, 33 tend to resume their normal spaced position with respect to each other. This results in the shoulder 35 engaging the under surface 43 of the supporting member 13 adjacent the slot 16. As additional downward force is applied to upper surfaces 44, 45 of the clamp 25 the legs 32, 33 are again forced inwardly toward each other and the lowermost shoulder 34 on leg 32 enters through the slot 16 until it engages the under surface 43 of the supporting member 13.

Downward force is continued upon the top surfaces 44, 45 of the clamp 25 until the arcuate projection 29 on the under surface 46 of the strip 26 engages the top of the cable 18. Since the under surface 46 of the strip is spaced from the cable (see Fig. 3) the projection 29 acts as a fulcrum and enables the surfaces 44, 45 to be depressed even further so that as many of the shoulders 34, 35 as possible may be inserted through the slot 16 before one of the shoulders on each pair of legs engages the under surface 43 of member 13.

To remove the clamp 25 from its locked position, it is only necessary to squeeze each pair of legs together so that the shoulders clear the edges 40, 41 of the slot 16, and then withdraw the clamp therefrom.

While good locking results are obtained when the corresponding shoulders on each of the leg members of a pair are equally spaced from the terminal end 30 of the strip 26, it has been noted that a tighter locking of the clamp 25 to the supporting member 13 is achieved when the distance of the shoulders on one of the legs 32 from the terminal end 30 of the strip 26 is greater than the distance of the corersponding shoulders on the leg member 33 from the terminal end 30 thereof. If the shoulders 34, 35 are equally spaced from the terminal end 30 of the strip 26 it will be necessary to insert legs 32, 33 through the slot 16 of supporting member 13 the distance between two successive shoulders before another locking position is achieved. However, by staggering the shoulders in the manner illustrated in Fig. 4 it is only necessary to insert the legs 32, 33 through the slot 16 of supporting member 13 for a distance approximately one-half the distance between two successive shoulders before a shoulder engages the under surface 43 of the member 13. Thus, a shoulder 35 first engages the under surface 43 of the supporting member 13 adjacent the slot 16. As the clamp is inserted further into the slot a shoulder 34 engages the under surface of the supporting member 13. For each downward movement of legs 32, 33 through slot 16 equivalent to approximately one-half the distance between successive shoulders on a leg, first one shoulder 35 on leg 33 engages the under surface 43 of the member 13, and then another shoulder 34 on leg 32 engages the under surface 43, et seq., until the legs of the clamp extend as far through the slot 16 as permitted by the cable 18 on the surface 17 of member 13.

It is to be noted that both side elevational views of the clamp of Fig. 3 are identical in the preferred embodiment of the invention. Since only one shoulder of each pair of leg members engages the under surface 43 of the supporting member 13 along one longitudinal edge of slot 16, the corresponding shoulder on the other pair of leg members will engage the under surface 43 adjacent the other edge of the slot 16. This will insure a stable locking of the clamp 25 to the member 13. In order to provide flexibility to the legs of the clamp, the slot 31 on the end portion of the clamp extends beyond the uppermost shoulders.

Although only one embodiment of the invention has been shown and described, it will be readily apparent to one skilled in the art that various changes and modifications may be made to the invention while still keeping within the scope of the invention, and it is intended that such changes and modifications be included in the appended claims.

Having fully described the invention what is claimed is:

1. A cable clamp for locking a cable to a slotted supporting member for said cable comprising a rectangular metal strip of U-shaped configuration having a slot extending longitudinally inwardly from each of the terminal ends thereof and forming a pair of laterally resilient leg members, the outer edges of each of said leg members including a plurality of shoulders, each of said shoulders being formed with an inwardly extending taper of said outer edge, said tapered edges facilitating entry of said shoulders into the slot of said supporting member to engage the peripheral bottom surface of said supporting member adjacent said slot.

2. A clamp for locking a cable to a slotted supporting member for said cable as defined in claim 1 wherein each succeeding shoulder on one edge of each of the slotted end portions of said strip is a greater distance from the terminal end of said strip than the corresponding shoulders on the other edge of each of said slotted end portions of said strip.

3. The clamp as defined in claim 1, having a projection centrally disposed on the under surface of said U-shaped metalic strip, said projection adapted to engage the outer surface of a cable to provide a fulcrum for the depression of the terminal ends of said strip into said slot.

References Cited in the file of this patent

UNITED STATES PATENTS

| | | |
|---|---|---|
| 1,022,121 | Boyland | Apr. 2, 1912 |
| 1,475,342 | Hirshstein | Nov. 27, 1923 |
| 1,794,817 | Zitko | Mar. 3, 1931 |
| 1,837,930 | Waite | Dec. 22, 1931 |
| 1,755,201 | Blackburn et al. | Apr. 22, 1930 |
| 2,058,733 | Smith | Oct. 27, 1936 |
| 2,371,232 | Edgington | Mar. 13, 1945 |
| 2,387,951 | Slater et al. | Oct. 30, 1945 |
| 2,416,876 | Kuenstler | Mar. 4, 1947 |
| 2,746,701 | Carpenter et al. | May 22, 1956 |

FOREIGN PATENTS

| | | |
|---|---|---|
| 569,618 | Germany | June 18, 1931 |